United States Patent
Qiu et al.

(10) Patent No.: US 11,048,541 B2
(45) Date of Patent: *Jun. 29, 2021

(54) VM-AWARE FTL DESIGN FOR SR-IOV NVME SSD

(71) Applicant: Samsung Electronics Co., Ltd., Suwon-si (KR)

(72) Inventors: Sheng Qiu, San Jose, CA (US); Yang Seok Ki, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,848

(22) Filed: Feb. 4, 2019

(65) Prior Publication Data

US 2019/0179660 A1    Jun. 13, 2019

Related U.S. Application Data

(63) Continuation of application No. 15/133,187, filed on Apr. 19, 2016, now Pat. No. 10,235,198.
(Continued)

(51) Int. Cl.
*G06F 12/00* (2006.01)
*G06F 9/455* (2018.01)
(Continued)

(52) U.S. Cl.
CPC .......... *G06F 9/45558* (2013.01); *G06F 3/061* (2013.01); *G06F 3/0655* (2013.01);
(Continued)

(58) Field of Classification Search
CPC ............... G06F 9/45558; G06F 3/0679; G06F 2009/45583
See application file for complete search history.

(56) References Cited

U.S. PATENT DOCUMENTS 6,334,134 B1 ‡  12/2001  Haderle ............ G06F 17/30595
6,598,143 B1 *   7/2003  Baker ................. G06F 12/023
                                                    707/999.202
(Continued)

FOREIGN PATENT DOCUMENTS

CN    103064632 A    4/2013
CN    103269361 A    8/2013
(Continued)

OTHER PUBLICATIONS

Chten, et al., "Virtual MaChine Image Content Aware I/O Optimization for Mobile Virtualization," 2015 IE EE 17th International Conference on High Performance Computing and Communications (HPCC), 2015 IE EE 7th International Symposium on Cyberspace Safety and Security (CSS), 2015 IEE E 12th.‡
(Continued)

*Primary Examiner* — Baboucarr Faal
(74) *Attorney, Agent, or Firm* — Lewis Roca Rothgerber Christie LLP

(57) ABSTRACT

A mass storage device for providing persistent storage. The system includes a plurality of instances of virtual flash translation layers, each associated with a namespace and configured to provide, to one or more virtual machines executing in a host connected to the mass storage device, access to read and write operations in the persistent storage.

20 Claims, 12 Drawing Sheets

Related U.S. Application Data

(60) Provisional application No. 62/299,502, filed on Feb. 24, 2016.

(51) Int. Cl.
 *G06F 13/38* (2006.01)
 *G06F 3/06* (2006.01)

(52) U.S. Cl.
 CPC ............ *G06F 3/0679* (2013.01); *G06F 12/00* (2013.01); *G06F 13/385* (2013.01); *G06F 2009/45579* (2013.01); *G06F 2009/45583* (2013.01)

(56) References Cited

U.S. PATENT DOCUMENTS

| | | | | |
|---|---|---|---|---|
| 6,961,806 B1 ‡ | 11/2005 | Agesen | ............... | G06F 9/45537 711/148 |
| 8,954,654 B2 ‡ | 2/2015 | Yu | ................ | G06F 12/0246 711/10 |
| 9,003,071 B2 ‡ | 4/2015 | Liu | ................ | G06F 13/16 710/3 |
| 9,645,917 B2 | 5/2017 | Small et al. | | |
| 10,241,908 B2 | 3/2019 | Tomlin | | |
| 2006/0179212 A1* | 8/2006 | Kim | ................ | G06F 12/0246 711/103 |
| 2007/0016582 A1* | 1/2007 | Kawamura | ............. | G06F 16/22 |
| 2007/0043771 A1* | 2/2007 | Ludwig | ............... | H04L 61/1582 |
| 2008/0147994 A1 | 6/2008 | Jeong et al. | | |
| 2012/0246443 A1 ‡ | 9/2012 | Meir | ................ | G06F 12/06 711/209 |
| 2013/0198746 A1* | 8/2013 | Kruglick | ............. | G06F 9/45558 718/1 |
| 2014/0304453 A1 ‡ | 10/2014 | Shao | ................ | G06F 12/0246 711/10 |
| 2015/0006663 A1 ‡ | 1/2015 | Huang | ................ | G06F 13/4221 709/21 |
| 2015/0134930 A1 ‡ | 5/2015 | Huang | ................ | G06F 12/1009 711/20 |
| 2015/0149661 A1 ‡ | 5/2015 | Kanigicherla | .......... | G06F 13/10 710/8 |
| 2015/0220432 A1 | 8/2015 | Hsu | | |
| 2015/0254003 A1 ‡ | 9/2015 | Lee | ................ | G06F 13/382 711/10 |
| 2015/0302111 A1 | 10/2015 | Yue et al. | | |
| 2015/0317088 A1 | 11/2015 | Hussain et al. | | |
| 2016/0092120 A1* | 3/2016 | Liu | ................ | G06F 3/0688 711/103 |
| 2016/0099810 A1 | 4/2016 | Li et al. | | |

FOREIGN PATENT DOCUMENTS

| | | |
|---|---|---|
| CN | 103744612 A | 4/2014 |
| JP | 2006-221627 A | 8/2006 |
| JP | 2008-152788 A | 7/2008 |
| JP | 2012-58770 A | 3/2012 |
| JP | 2014-513356 A | 5/2014 |
| JP | 2015-518987 A | 7/2015 |
| TW | 200834593 A | 8/2008 |

OTHER PUBLICATIONS

Chen, et al., "Virtual Machine Image Content Aware I/O Optimization for Mobile Virtualization," *2015 IEEE 17th International Conference on High Performance Computing and Communications (HPCC), 2015 IEEE 7th International Symposium on Cyberspace Safety and Security (CSS), 2015 IEEE 12th International Conference on Embedded Software and Systems (ICESS)*, © 2015, pp. 1031-1036.

Wu, Chin-Hsien et al.; An Efficient B-Tree Layer for Flash-Memory Storage Systems, Department of Computer Science and Information Engineering, National Taiwan University, Taipei, Taiwan, 2003, 20 pages.

Song, Xiang, et al., "Architecting Flash-based Solid-State Drive for High-performance I/O Virtualization," IEEE Computer Architecture Letters, vol. 13, No. 2, 2014, 5 pages.

\* cited by examiner
‡ imported from a related application

VM-AWARE FTL DESIGN FOR SR-IOV NVME SSD

CROSS-REFERENCE TO RELATED APPLICATION(S)

The present application is a continuation of U.S. patent application Ser. No. 15/133,187, filed Apr. 19, 2016, which claims priority to and the benefit of U.S. Provisional Application No. 62/299,502, filed Feb. 24, 2016, entitled "VM-AWARE FTL DESIGN FOR SR-IOV NVME SSD". The entire contents of both of the documents identified in this paragraph are incorporated herein by reference.

FIELD

One or more aspects of embodiments according to the present invention relate to mass storage devices, and more particularly to a system and method for providing access to mass storage through virtual flash translation layer instances.

BACKGROUND

In a system in which a host machine with a solid state drive runs a plurality of virtual machines, single root input/output virtualization (SR-IOV) may allow each virtual machine to interact with persistent storage through an interface that emulates a separate mass storage device for each virtual machine. If the interface uses a shared flash translation layer in the solid state drive, however, the performance of the persistent storage interface that one virtual machine interacts with may be affected by, and/or degraded by, interactions between other virtual machines and persistent storage.

Thus, there is a need for a system and method of reducing the interactions of virtual machines in their respective persistent storage access operations.

SUMMARY

Aspects of embodiments of the present disclosure are directed toward a virtual flash translation layer that is virtual machine aware.

According to an embodiment of the present invention there is provided a mass storage device, including: a flash memory including a plurality of physical blocks, each of the physical blocks including a plurality of physical pages, the plurality of physical blocks including: a first set of physical blocks; and a second set of physical blocks, the first set of physical blocks and the second set of physical blocks being disjoint; and a controller configured to implement a first virtual flash translation layer instance and a second virtual flash translation layer instance, the first virtual flash translation layer instance being configured to receive storage access requests directed to logical page numbers and to generate storage access requests directed to physical page numbers within the first set of physical blocks, and the second virtual flash translation layer instance being configured to receive storage access requests directed to logical page numbers and to generate storage access requests directed to physical page numbers within the second set of physical blocks.

In one embodiment, each of the first virtual flash translation layer instance and the second virtual flash translation layer instance is further configured to perform garbage collection operations on its respective set of physical blocks.

In one embodiment, the first virtual flash translation layer instance has a first weight and the second virtual flash translation layer instance has a second weight, the first set of physical blocks includes a first plurality of overprovision blocks reserved for storage of data for garbage collection operations, the second set of physical blocks includes a second plurality of overprovision blocks reserved for storage of data for garbage collection operations, and the product of: the ratio of the number of physical blocks in the first plurality of overprovision blocks, to the number of physical blocks in the first set of physical blocks, and the ratio of the number of physical blocks in the second set of physical blocks to the number of physical blocks in the second plurality of overprovision blocks, is equal to the ratio of the first weight to the second weight.

In one embodiment, the device includes: one or more first packages, each including a page allocated to the first virtual flash translation layer instance, and one or more second packages, each not including any pages allocated to the first virtual flash translation layer instance, the device further including a page allocator, the page allocator being configured to allocate pages to the first virtual flash translation layer instance in response to storage access requests, the allocation of pages to the first virtual flash translation layer instance including: allocating a page in a package of the one or more first package, when a page is available in any of the one or more first packages; and allocating a page in a package of the one or more second packages, when no page is available in any of the one or more first packages.

According to an embodiment of the present invention there is provided a system including: a host including: a first virtual machine associated with a first namespace; and a second virtual machine associated with a second namespace, the first virtual machine being configured to send storage access requests to a first virtual flash translation layer instance instantiated in a mass storage device, and the second virtual machine being configured to send storage access requests to a second virtual flash translation layer instance instantiated in the mass storage device.

In one embodiment, the host further includes: a third virtual machine associated with the second namespace, the third virtual machine being configured to send storage access requests to the second virtual flash translation layer instance.

In one embodiment, the host includes a hypervisor, configured to assign to each of the first virtual machine and the second virtual machine a weight in proportion to an anticipated write activity level of the virtual machine.

In one embodiment, the host includes a hypervisor, configured to assign each of the first virtual machine and the second virtual machine a weight in proportion to a persistent storage quality of service of the virtual machine.

In one embodiment, the system includes the mass storage device, wherein: the mass storage device includes: a flash memory including a plurality of physical blocks, each of the physical blocks including a plurality of physical pages, the plurality of physical blocks including: a first set of physical blocks; and a second set of physical blocks, the first set of physical blocks and the second set of physical blocks being disjoint; a controller configured to implement a first virtual flash translation layer instance and a second virtual flash translation layer instance, and each of the first virtual flash translation layer instance and the second virtual flash translation layer instance is further configured to perform garbage collection operations on its respective set of physical blocks.

In one embodiment, the first virtual flash translation layer instance has a first weight and the second virtual flash translation layer instance has a second weight, the first set of physical blocks includes a first plurality of overprovision blocks reserved for storage of data for garbage collection operations, the second set of physical blocks includes a second plurality of overprovision blocks reserved for storage of data for garbage collection operations, and the ratio of: the ratio of: the number of physical blocks in the first plurality of overprovision blocks, to the number of physical blocks in the first set of physical blocks, to the ratio of: the number of physical blocks in the second plurality of overprovision blocks, to the number of physical blocks in the second set of physical blocks, is equal to the ratio of the first weight to the second weight.

In one embodiment, the system includes: one or more first packages each including a page allocated to the first virtual flash translation layer instance and one or more second packages, each not including any pages allocated to the first virtual flash translation layer instance, the first packages and the second packages together including all packages of the device and including the plurality of physical blocks, the device further including a page allocator, the page allocator being configured to allocate pages to the first virtual flash translation layer instance in response to storage access requests, the allocation of pages to the first virtual flash translation layer instance including: allocating a page in a package of the one or more first package, when a page is available in any of the one or more first packages; and allocating a page in a package of the one or more second packages, when no page is available in any of the one or more first packages.

According to an embodiment of the present invention there is provided a method, including: receiving, by a first virtual flash translation layer instance in a mass storage device including a plurality of physical blocks, a first storage access request directed to a first logical page number; generating, by the first virtual flash translation layer instance, a storage access request directed to a physical page number within a first subset of the plurality of physical blocks; receiving, by a second virtual flash translation layer instance in the mass storage device, a second storage access request directed to a second logical page number; and generating, by the second virtual flash translation layer instance, a storage access request directed to a physical page number within a second subset of the plurality of physical blocks, the first subset and the second subset being disjoint.

In one embodiment, the method includes: creating, by a host, a first namespace and a second namespace; attaching, by the host, the first namespace to a first virtual function configured to interact with the first virtual flash translation layer instance; and attaching, by the host, the second namespace to a second virtual function configured to interact with the second virtual flash translation layer instance.

In one embodiment, the method includes: creating, by the host, a first virtual machine and a second virtual machine, assigning, by the host, the first virtual function to the first virtual machine, and assigning, by the host, the second virtual function to the second virtual machine.

In one embodiment, the method includes, composing, by a guest device driver on the host, a read request including the first namespace; receiving, by the mass storage device, through the first virtual function, the read request; processing, by the first virtual flash translation layer instance, the read request; and returning, through the first virtual function, a result of the read request.

In one embodiment, the method includes, composing, by a guest device driver on the host, a write request including: data to be written and an identifier for a first namespace; receiving, by the mass storage device, through the first virtual function, the write request; processing, by the first virtual flash translation layer instance, the write request; requesting, by the first virtual flash translation layer instance, from a page allocator of the mass storage device, one or more physical page numbers corresponding to physical pages available for writing; receiving one or more physical page numbers from the page allocator; and writing the data to one or more physical pages corresponding to the received one or more physical page numbers.

In one embodiment, the method includes performing garbage collection operations, by the first virtual flash translation layer instance, on the first subset.

In one embodiment, the first virtual flash translation layer instance has a first weight and the second virtual flash translation layer instance has a second weight, the first subset includes a first plurality of overprovision blocks reserved for storage of data for garbage collection operations, the second subset includes a second plurality of overprovision blocks reserved for storage of data for garbage collection operations, and the product of: the ratio of the number of physical blocks in the first plurality of overprovision blocks, to the number of physical blocks in the first set of physical blocks, and the ratio of the number of physical blocks in the second set of physical blocks to the number of physical blocks in the second plurality of overprovision blocks, is equal to the ratio of the first weight to the second weight.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of example embodiments of a virtual machine aware (VM-aware) flash translation layer (FTL) design for a solid state drive (SSD) provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
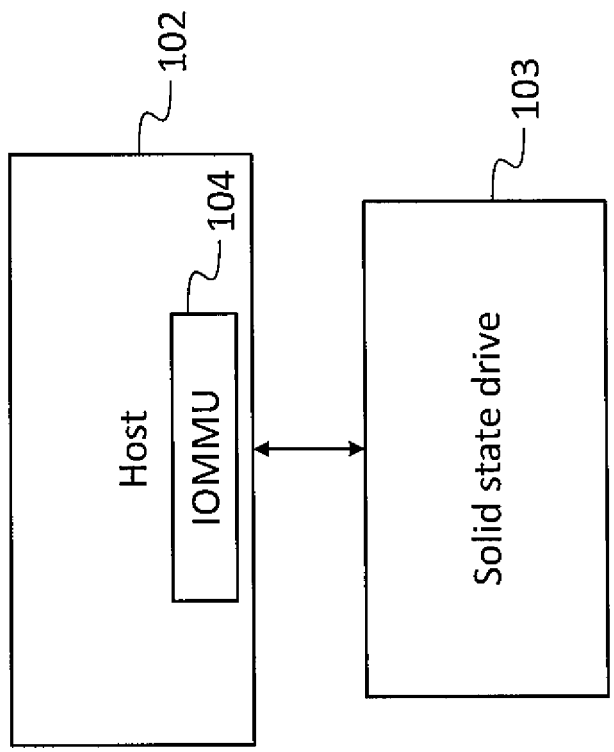
FIG. 1A is a block diagram of a host connected to a mass storage device, according to an embodiment of the present invention.
Figure 1B:
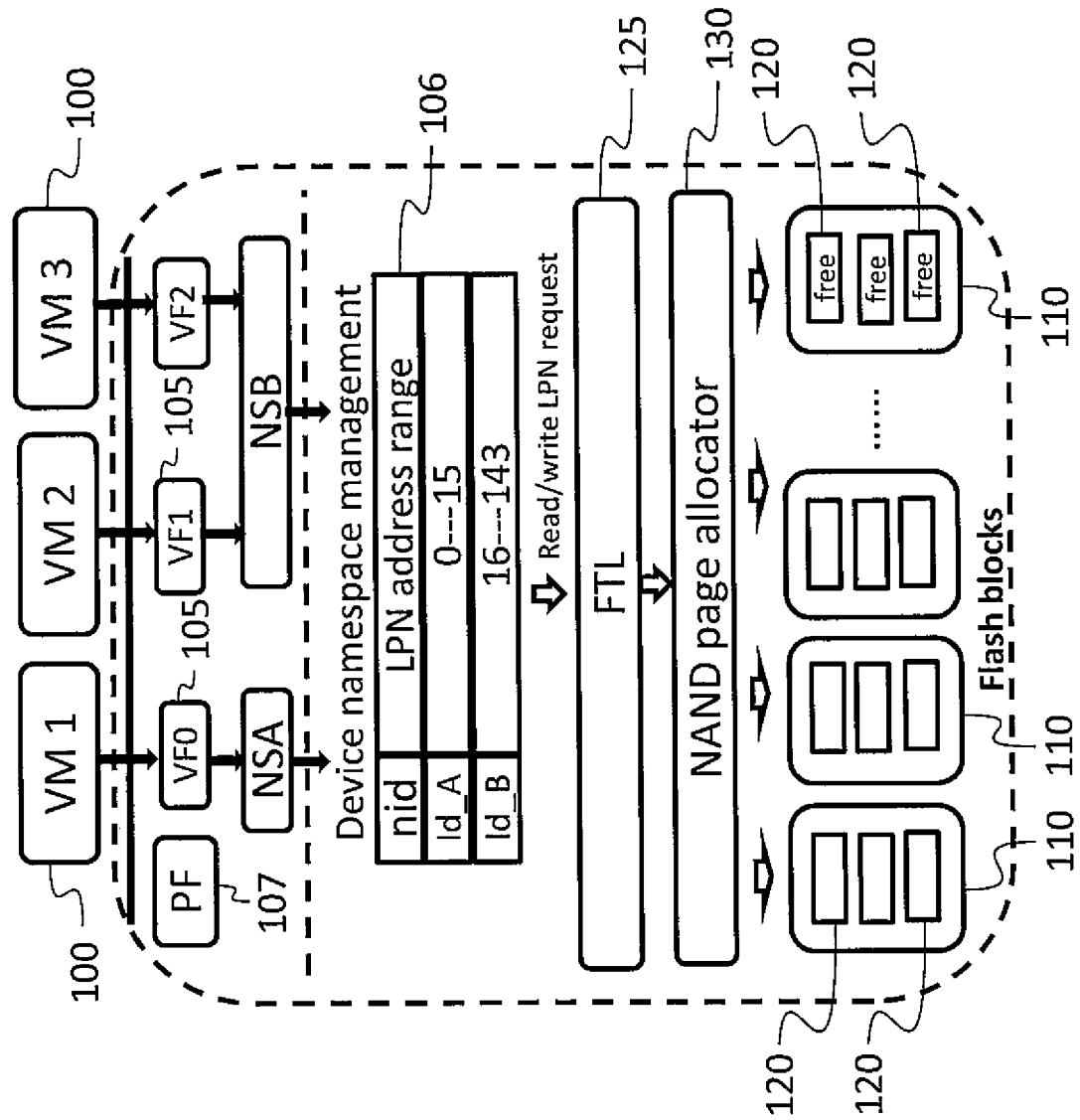
FIG. 1B is a block diagram of a plurality of virtual machines interacting with a mass storage device including a related art flash translation layer.

FIG. 1A shows a host 102 connected to a solid state drive 103. FIG. 1B shows the architecture of a related art system employing a single root input/output virtualization Non Volatile Memory Express solid state drive. Multiple virtual machines 100 run on a host 102. The host may include a processor (e.g., a microprocessor) and a memory. The virtual machines 100 call various virtual functions 105 to interact with persistent storage. The virtual functions 105 may be provided by a guest device driver in the host 102. As used herein, a "host" is a computer (e.g., a server) that is connected to, and makes use of, one or more mass storage devices. Each virtual machine may make storage access requests (e.g., requests to read data from persistent storage, to write data to persistent storage, or to erase data in persistent storage). Each storage access request may be made through a call to a virtual function. Persistent storage may be implemented on a mass storage device, e.g., a hard disk drive and/or a solid state drive (SSD) and/or a USB "stick" or "thumb drive" and/or a memory card. Single root input/output virtualization may be used to allow a mass storage device to separate access to its resources among various Peripheral Component Interconnect Express (PCIe) hardware functions. These functions may include a PCIe physical function (PF) 107 and one or more PCIe virtual functions 105 (VFs). Each physical function 107 and virtual function 105 may be assigned a unique PCI Express Requester identifier (RID) that allows an input/output memory management unit (IOMMU) 104 to differentiate between different traffic streams. Thus, assigning virtual functions 105 to different virtual machines 100 (VMs) may prevent input/output streams of different virtual machines 100 from interfering with each other while transferring data between the virtual machines 100 and mass storage device.

Flash memory in a solid state drive 103 may be organized into physical blocks 110 (or "flash blocks") and physical pages 120. A physical block 110 may be the smallest unit of memory that is erasable in one operation, and a physical page 120 may be the smallest unit of memory that can be written in one operation. Each physical block 110 may include a plurality of physical pages 120, and the size of the physical pages 120 may vary based on implementation. Pages in the flash memory may be allocated by a NAND page allocator 130. The host 102 may interact with the mass storage device with storage access requests directed to logical page numbers, e.g., requesting data stored in a page at a logical page number, requesting that data be written to a page at a logical page number, or requesting that data stored in a page at a logical page number be erased. Directly or statically mapping the logical page number to physical page numbers may be inefficient because writing new data into a physical page 120 may require that the contents of the entire physical block 110 containing the physical page 120 be saved elsewhere, the physical block 110 be erased, and the saved contents be re-written to the block, with the new data substituted for the data previously in the same location. As used herein, a "physical page number" is an identifier (e.g., a number) that uniquely identifies a page within the mass storage device.

To avoid these burdensome operations, a flash translation layer 125 may translate or map logical page numbers dynamically into physical page numbers. When new data is to be overwritten over data in a page at a logical page number, the flash translation layer 125 may then mark the physical page 120 currently corresponding to the logical page number as invalid (instead of erasing the physical block 110 containing this physical page 120), update the mapping from logical page numbers to physical pages 120 to map the logical page number to a new physical page 120, and write the new data into the new physical page 120. Occasionally the flash translation layer 125 may perform an operation referred to as "garbage collection". In this operation, any physical block 110 that contains a large proportion (e.g., a proportion exceeding a set threshold) of physical pages 120 that have been marked as invalid may be erased, after its valid contents have been moved to other physical pages 120 in one or more other physical blocks 110, causing the newly erased physical block 110 to be available for writing of new data. The flash translation layer 125 may be implemented in software running on a controller (e.g., a microcontroller) in the solid state drive 103.

In some embodiments, the virtual functions 105 are assigned to different virtual machines 100 and each virtual function is associated with a namespace reserved on the mass storage device (e.g., namespaces referred to as namespace A (NSA) and namespace B (NSB) in FIG. 1B). In the example system of FIG. 1B, two virtual functions (virtual function 1 and virtual function 2) share one namespace (NSB). Storage access requests from different virtual machines 100 may be processed by calling different virtual functions 105. This may result in the input/output paths between the hosted virtual machines 100 and the mass storage device's host interface layer (HIL) being separated.

However, physical pages 120 allocated to different virtual machines 100 may share physical blocks 110. Storage access requests from different virtual machines 100 may be mapped to logical pages identified by logical page numbers in the mass storage device, and forwarded to the flash translation layer 125 in the format of a storage access request directed to a logical page number. Thus, the input of the flash translation layer 125 may lack semantic information linking a particular storage access request with the virtual machine from which it originated. As a result of this, for example, a write request from a first virtual machine (e.g., VM 1) may result in invalidating a physical page 120, which results in garbage collection affecting a physical block 110. This may delay the processing of a storage access request, e.g., a read request sent by a second virtual machine (e.g., VM 2) to a logical page mapped to a physical page 120 in the same physical block 110. As such, the quality of service provided to any of the virtual machines 100 may be affected, e.g., degraded, and rendered less predictable, by storage access requests sent by other virtual machines 100.

To enable better device virtualization of the single root input/output virtualization (SR-IOV) feature, the flash translation layer 125 may be virtualized. For example the flash translation layer 125 may be replaced by a plurality of virtual flash translation layer (vFTL) instances 210 so that input/output paths are separated at the plurality of virtual flash translation layer instances 210 for different virtual machines 100.

Figure 2:
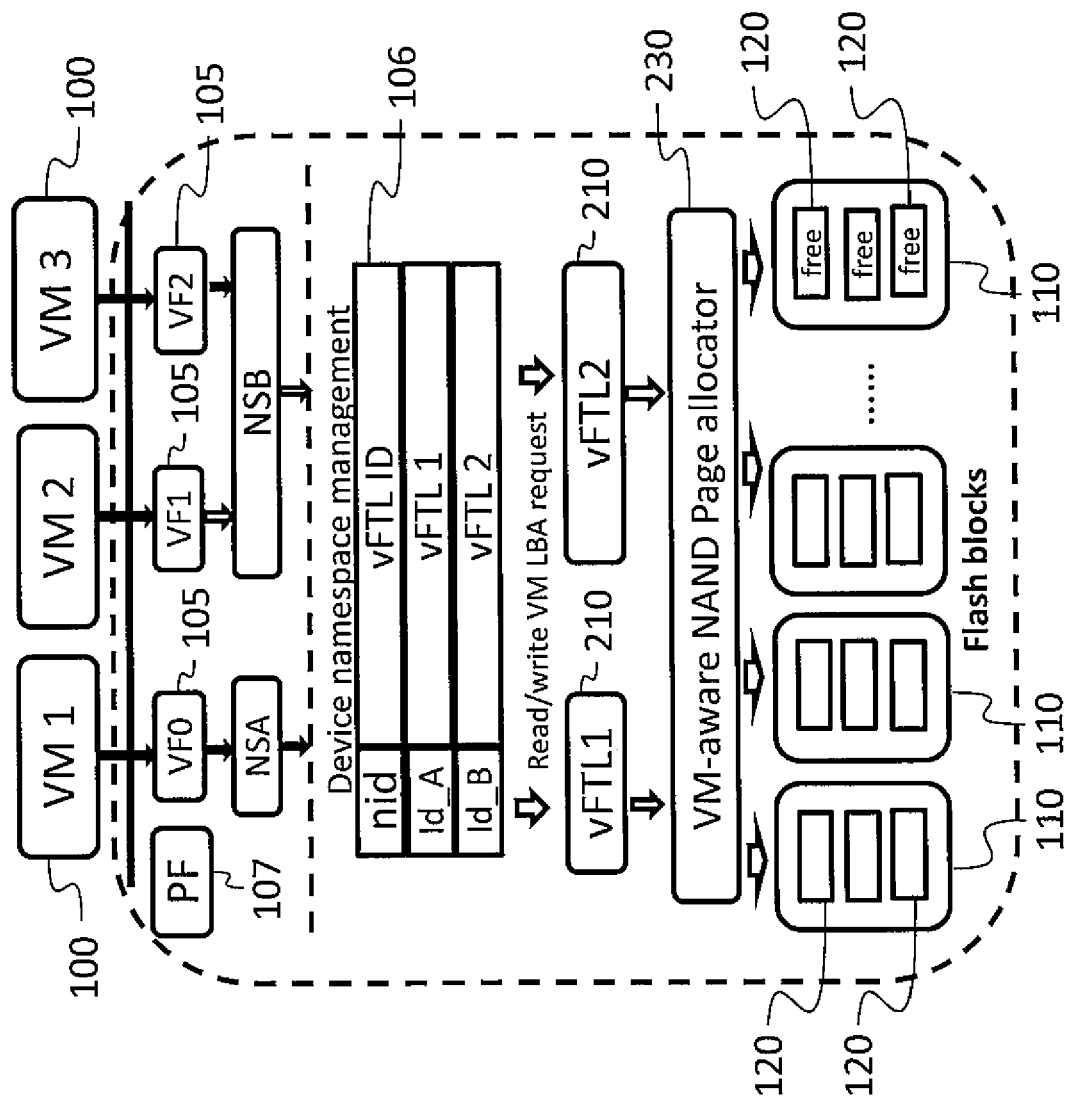
FIG. 2 is a block diagram of a plurality of virtual machines interacting with a mass storage device including a plurality of virtual flash translation layer instances, according to an embodiment of the present invention.

Referring to FIG. 2, in one embodiment, a virtual flash translation layer instance 210 is created for each assigned virtual function or namespace. A storage access request from a particular virtual function is associated with the namespace of that virtual function, and, accordingly, forwarded to the virtual flash translation layer instance 210 associated with the namespace. Unlike the situation in the system of FIG. 1B, namespaces in the embodiment of FIG. 2 are not mapped to ranges or sets of logical page numbers, but instead are mapped to virtual flash translation layer instances 210. As a result, the storage access requests from different virtual machines 100 are isolated at the virtual flash translation layer, reducing the effect that storage access requests submitted by one virtual machine may have on the quality of service received by another virtual machine. Physical pages 120 may be allocated by a VM-aware NAND page allocator 230.

Figure 3:
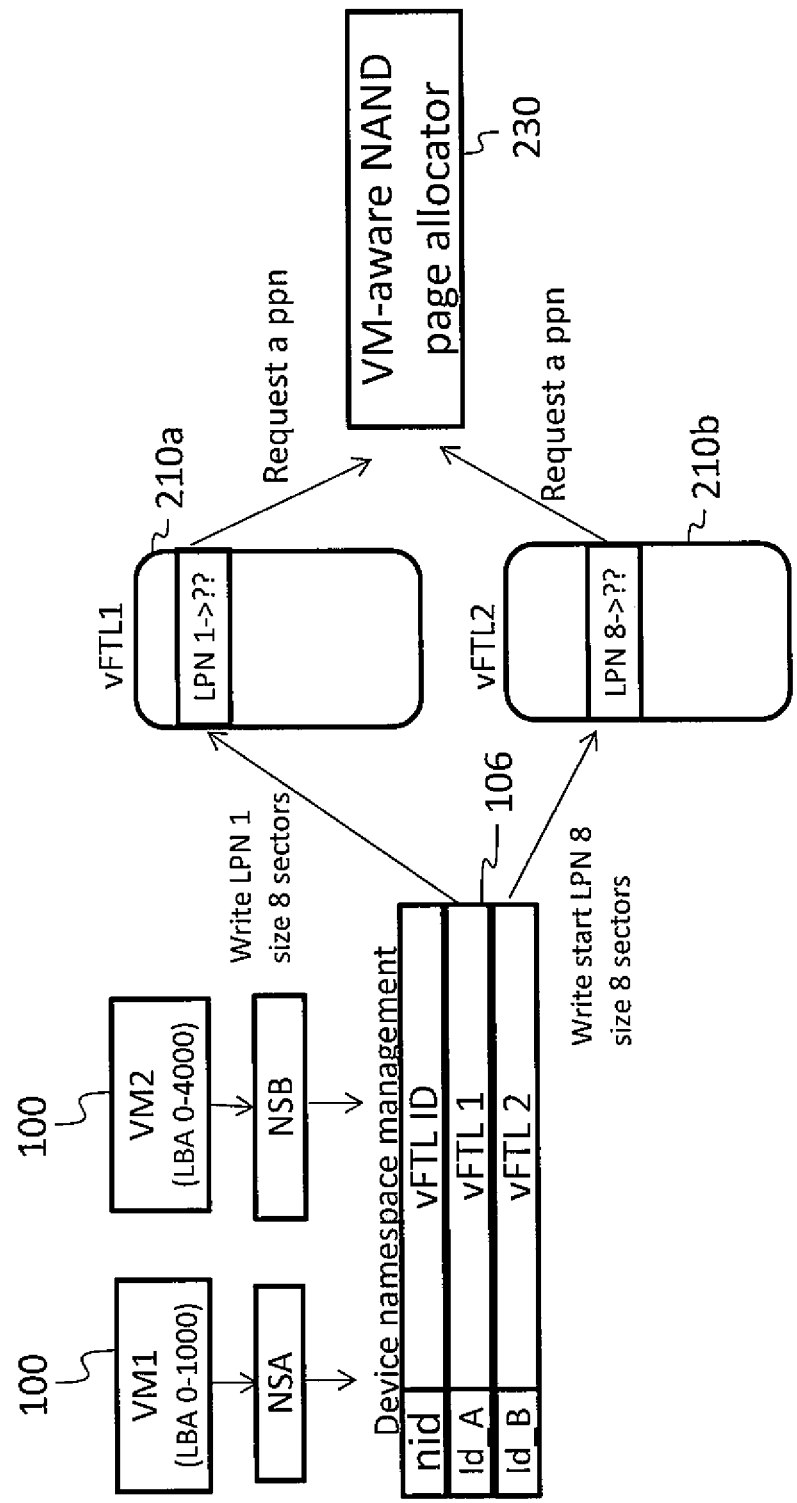
FIG. 3 is a block diagram of a plurality of virtual machines interacting with a mass storage device through a plurality of virtual flash translation layer instances and a virtual machine aware NAND page allocator, according to an embodiment of the present invention.

Referring to FIG. 3, in one embodiment, as mentioned above, each virtual flash translation layer instance 210 is a software component at the flash translation layer of firmware running on a controller of the mass storage device (e.g., of the solid state drive 103). It may have the full functionality of related art flash translation layer software but, unlike such flash translation layer software, it may be built and organized according to virtual machine and virtual function namespace, or according to mass storage device namespace. In FIG. 3, there are two virtual machines 100, a first virtual machine VM1 and a second virtual machine VM2, and each is assigned a separate device namespace by a namespace manager 106. If the first virtual machine VM1 issues a storage access request, e.g., a write request, the mass storage device may route it to a first virtual flash translation layer instance, 210a. The write request may require allocation of a logical page (and a corresponding physical page) that may have a size of 8 sectors; the physical page may be identified by a physical page number. The first virtual flash translation layer instance 210a may then make a corresponding storage access request to the NAND page allocator 230 to provide a number of physical pages 120, corresponding to an amount of memory (e.g., 8 sectors) required to execute the write request, and then flush the write data to the allocated physical flash pages. The storage access request may also include requesting the physical page number (ppn) of the allocated physical page. Finally the virtual flash translation layer instance 210a may update the logical to physical mappings (e.g., the mappings of virtual machine logical block addresses or logical page numbers to physical page numbers such as NAND flash page numbers). On the other hand, a storage access request made by the second virtual machine VM2 may be routed to a second virtual flash translation layer instance 210b for further handling. The virtual flash translation layer instances (e.g., the first virtual flash translation layer instance, 210a and the second virtual flash translation layer instance, 210b) may be independent of each other and "unaware" of each other, in the sense that these software elements need not exchange information or requests. In this manner, this system may avoid interference between the storage access requests made by the first virtual machine VM1 and the storage access requests made by the second virtual machine VM2.

Figure 4A:
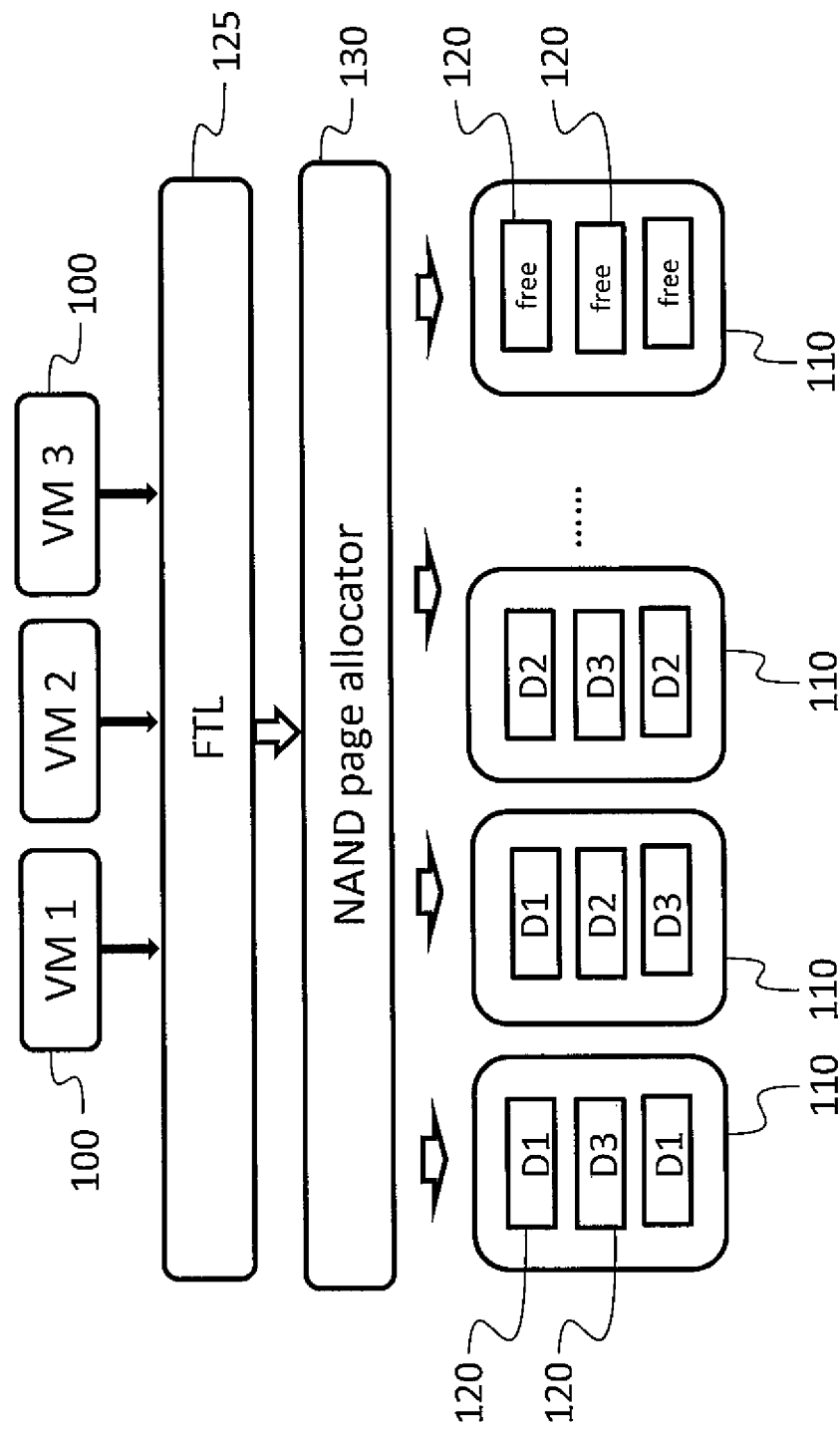
FIG. 4A is a block diagram of a related art flash translation layer, a NAND page allocator, and a plurality of physical blocks of flash memory.

Referring to FIG. 4A, as mentioned above, a related art flash translation layer 125 and the NAND page allocator 130 may not differentiate according to the source of an incoming storage access request, and, for example the data from three different virtual machines 100 may be written to the same physical block 110. In FIG. 4A, pages containing data from three virtual machines 100, a first virtual machine, a second virtual machine, and a third virtual machine, are labelled D1, D2, and D3, respectively, and, as illustrated, in each of the physical blocks 110, data from several of the different virtual machines 100 are commingled.

Figure 4B:
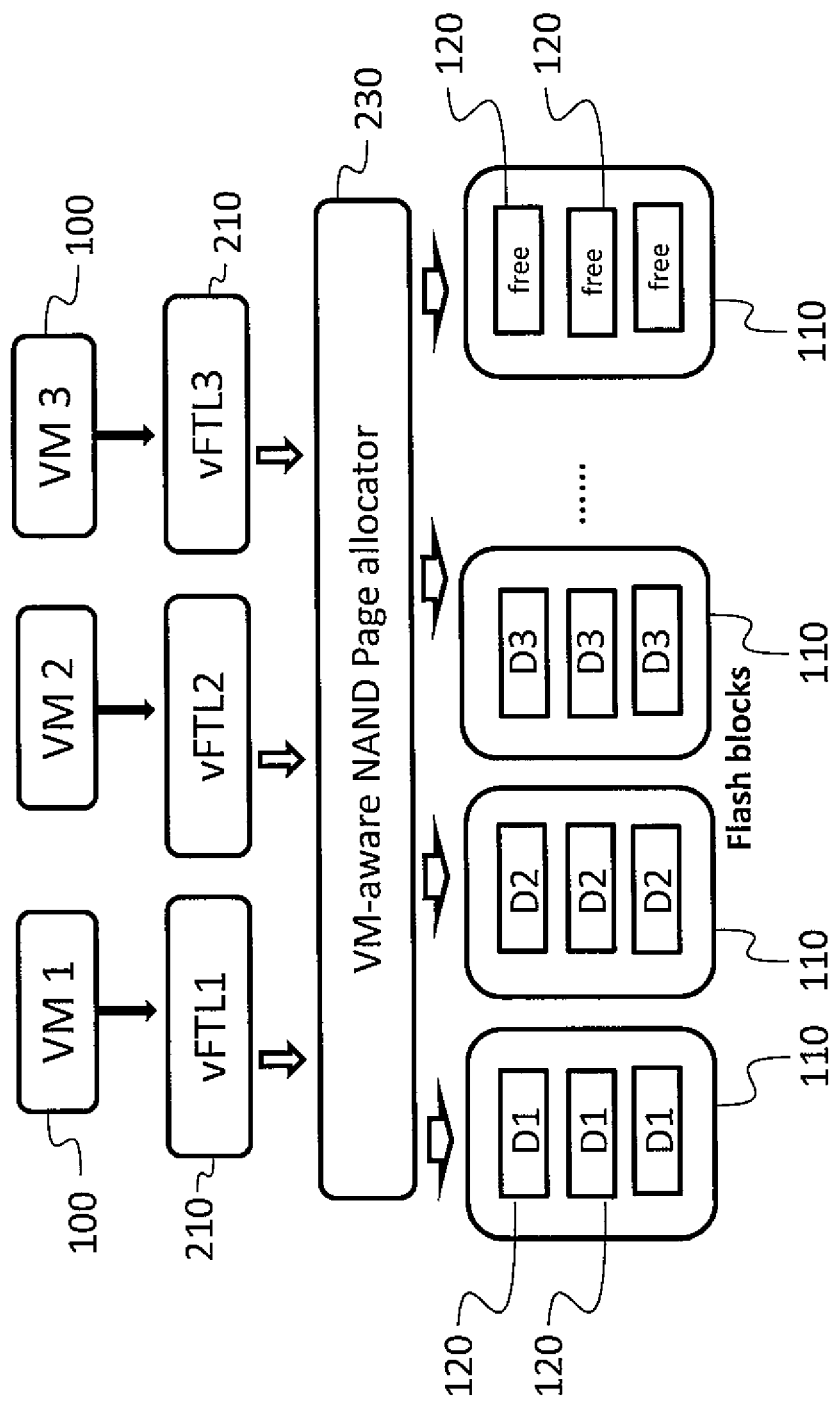
FIG. 4B is a block diagram of a plurality of virtual machines interacting with a mass storage device including a plurality of virtual flash translation layer instances and a virtual machine aware NAND page allocator, according to an embodiment of the present invention.

Referring to FIG. 4B, by contrast, in some embodiments of the present invention, storage access requests from three virtual machines 100, a first virtual machine, a second virtual machine, and a third virtual machine, are processed by three separate respective virtual flash translation layer instances vFTL1, vFTL2, and vFTL3, each of which make requests to the NAND page allocator 230, for pages in blocks already associated with their respective namespaces (and virtual machines 100), or, if too few such pages are available, for pages in blocks that are not currently associated with any namespace or virtual machine. In this manner, the NAND page allocator 230 is made to be virtual machine aware, and, as a result, data from the first virtual machine, the second virtual machine, and the third virtual machine, labelled, respectively, D1, D2, and D3, in FIG. 4B, are not commingled and are written to distinct physical blocks 110.

Figure 4C:
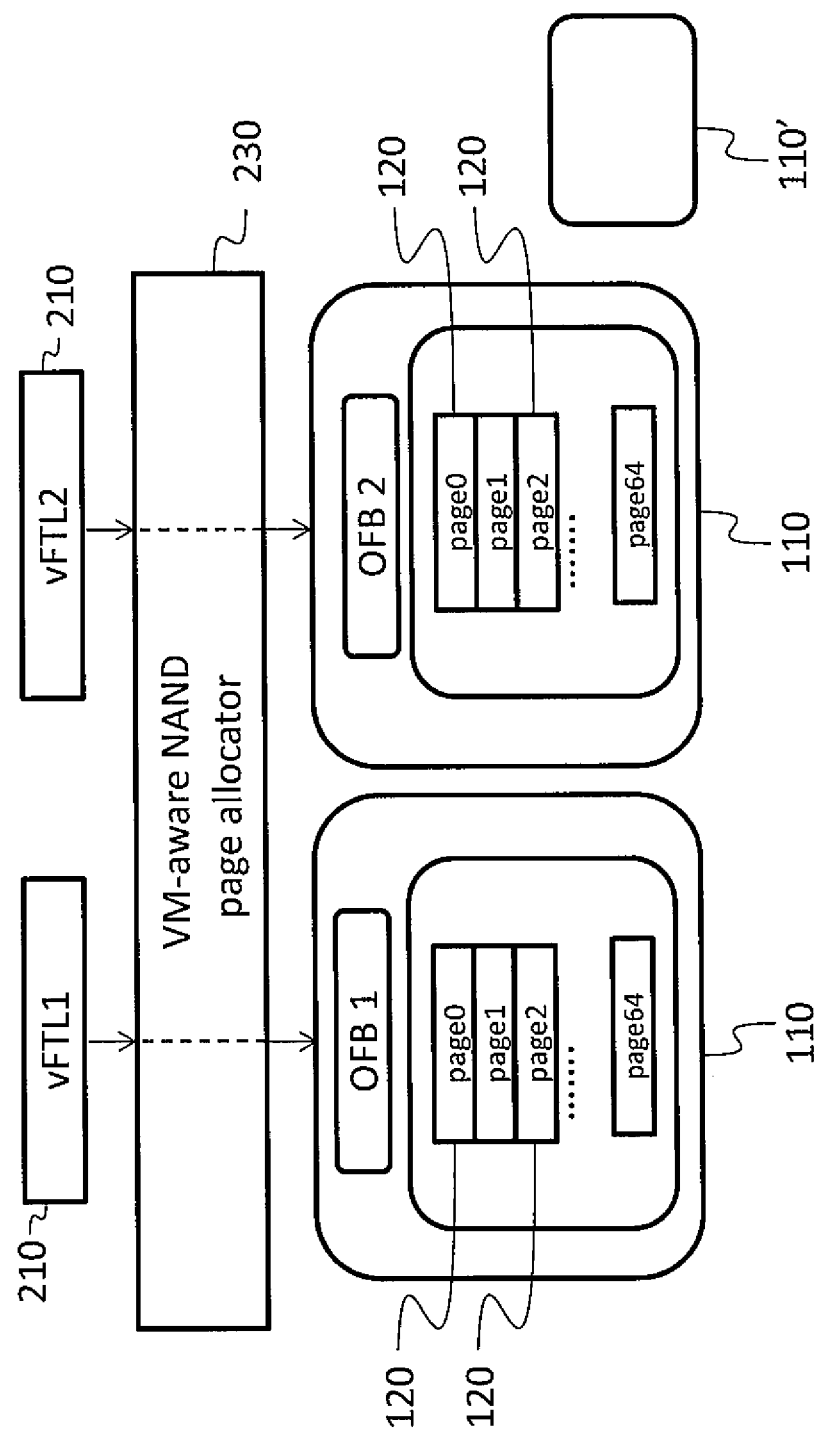
FIG. 4C is a block diagram of a plurality of virtual machines interacting with a mass storage device including a plurality of virtual flash translation layer instances and a virtual machine aware NAND page allocator, according to an embodiment of the present invention.

Referring to FIG. 4C, in one embodiment a virtual machine aware NAND page allocator 230 maintains a list containing, for each virtual flash translation layer instance 210, an "open flash block" (OFB) that is a physical block or blocks 110 which contains free pages. When any virtual flash translation layer instance 210 requests a new physical page number, the virtual machine aware NAND page allocator 230 returns the next available physical page number within the open flash block 110 listed for that virtual flash translation layer instance 210. If a write request is received from a virtual flash translation layer instance 210 and there is insufficient space in the open flash block 110 listed for that virtual flash translation layer instance 210, or if the execution of a write request results in filling the current open flash block 110, then the virtual machine aware NAND page allocator 230 may allocate a new physical block 110, to accommodate the write request, and, if the new physical block 110 remains partially empty after completion of the write request, the virtual machine aware NAND page allocator 230 may add the address of the new physical block 110 to the list of open flash blocks 110. For example, if the open flash block 110 associated with the second virtual flash translation layer instance vFTL2 of FIG. 4C is filled up by a write request, so that all pages are used, then the virtual machine aware NAND page allocator 230 will allocate a new physical block 110' and identify it as the open flash block of the second virtual flash translation layer instance vFTL2.

Figure 4D:
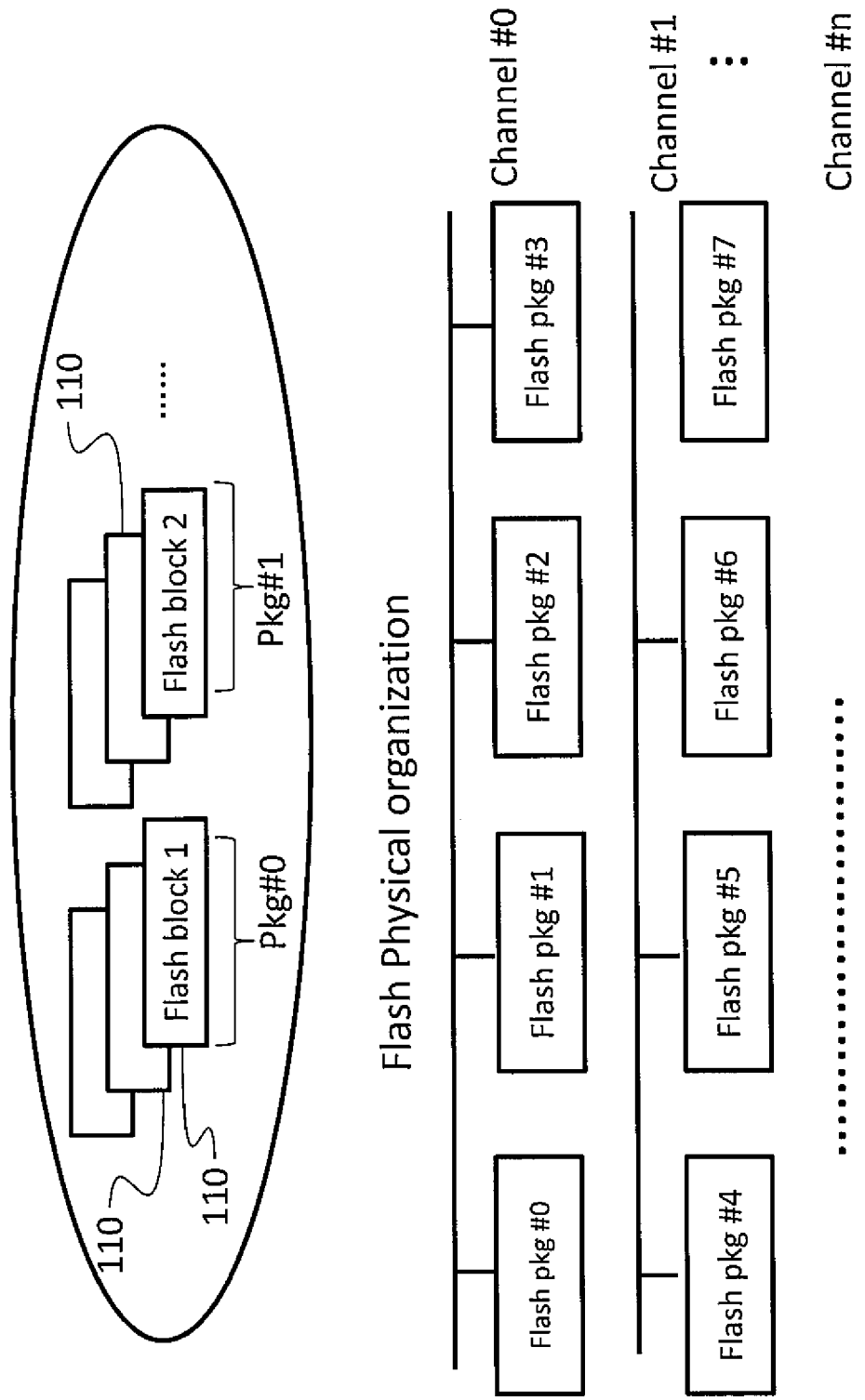
FIG. 4D is a block diagram showing organization of flash blocks in packages and flash packages in a mass storage device, according to an embodiment of the present invention.

Referring to FIG. 4D, the virtual machine aware NAND page allocator 230 may be configured to allocate new flash blocks 110 so as to preferentially distribute physical blocks 110 of different virtual flash translation layer instances 210 to different flash packages, dies, or planes. The packages may be organized into channels (e.g., Channel #0, Channel #1, etc., as shown). This may be accomplished, for example, when a particular virtual flash translation layer instance 210 makes a request for a new block, by allocating a physical block 110 in a package that already includes other physical blocks 110 allocated to the virtual flash translation layer instance 210, or, if no such package has any free physical blocks 110, allocating a physical block 110 in a package in which no physical blocks 110 have yet been allocated. Thus, for example, a first physical block (labeled "Flash block 1" in FIG. 4D) allocated to a first virtual flash translation layer instance may be allocated in package number 0 in the mass storage device along with other physical blocks 110 allocated to the first virtual flash translation layer instance, and a second physical block (labeled "Flash block 2" in FIG. 4D) allocated to a second virtual flash translation layer instance may be allocated in package number 1 in the mass storage device, along with other physical blocks 110 allocated to the second virtual flash translation layer instance. These packages may, for example, be integrated circuits soldered to a printed circuit board (or "printed wiring board") in the mass storage device (e.g., the solid state drive 103).

Figure 5A:
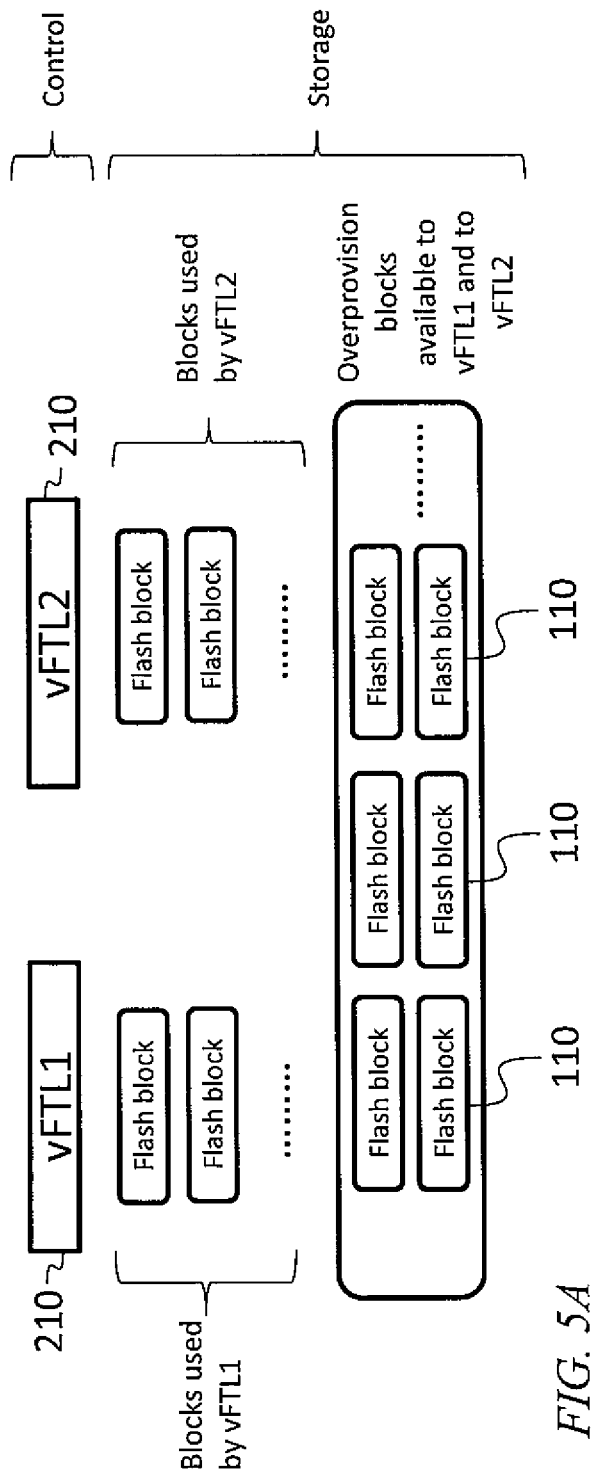
FIG. 5A is a block diagram of a plurality of virtual flash translation layer instances interacting with a plurality of flash blocks, according to an embodiment of the present invention.
Figure 5B:
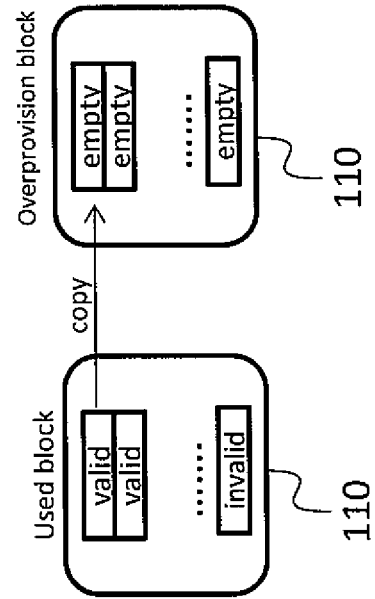
FIG. 5B is a hybrid block and dataflow diagram illustrating migration of data to overprovision blocks during garbage collection, according to an embodiment of the present invention.

Referring to FIG. 5A, in some embodiments, garbage collection (GC) is triggered whenever the number of free flash blocks drops to a threshold defined for the mass storage device. Each virtual flash translation layer instance 210 manages garbage collection by itself. A certain number of overprovision flash blocks 110 are allocated for each virtual flash translation layer instance 210 while initializing the virtual flash translation layer instance 210. During a garbage collection operation, physical blocks having a proportion of invalid physical pages exceeding a set threshold, may be erased, and made available for writing, after the contents of their valid physical pages have first been moved to other physical blocks, i.e., overprovision blocks. As such, the overprovision blocks may be used to provide a specified amount of storage while leaving some storage space unused, e.g., space in physical pages 120 that have been invalidated, before the physical block 110 containing the invalidated physical pages 120 is erased and again available for storage. For example, as illustrated in FIG. 5B, when performing garbage collection to free up a physical block 110 containing a number of invalid physical pages 120, each virtual flash translation layer instance 210 may first migrate valid data to a free flash block 110 then erase the physical block 110 being freed up. Overprovision may provide additional free flash blocks 110 to which garbage collection may migrate valid data, from physical blocks 110 containing invalid pages before erasing them.

By default, the overprovision flash blocks 110 provided to each virtual flash translation layer instance 210 are proportional to the number of physical blocks 110 allocated to the virtual flash translation layer instance 210. The ratio of the number of overprovision flash blocks 110 to the number of allocated blocks may however in some embodiments be customized according to (e.g., customized to be proportional to) a weight assigned to each virtual flash translation layer instance 210. The weight of each virtual flash translation layer instance 210 may for example be user-defined. In some embodiments, each virtual machine has a weight (e.g., a user-defined weight, or a hypervisor-assigned weight), and the weight of each virtual flash translation layer instance 210 is the weight of a virtual machine connected to the virtual flash translation layer instance 210, or, if a plurality of virtual machines share a virtual flash translation layer instance 210, the weight of each virtual flash translation layer instance 210 is the total of the weights of these virtual machines.

The weight of a virtual machine may be proportional, for example, to an anticipated write activity level of the virtual machine (e.g., the frequency with which the virtual machine is expected to request write operations, or the amount of data the virtual machine is expected to write per unit time), or to a quality of service appropriate for the virtual machine.

When the mass storage device sets up the virtual flash translation layer instances 210 for a first virtual machine VM1 and a second virtual machine VM2, the host 102 may configure the respective weights of the first virtual machine VM1 and of the second virtual machine VM2. Then the firmware, e.g., a first virtual flash translation layer instance and a second virtual flash translation layer instance, corresponding respectively to the first virtual machine VM1 and to the second virtual machine VM2, may allocate numbers of overprovision blocks based on the physical capacity allocated to the first virtual flash translation layer instance and a second virtual flash translation layer instance.

Figure 6A:
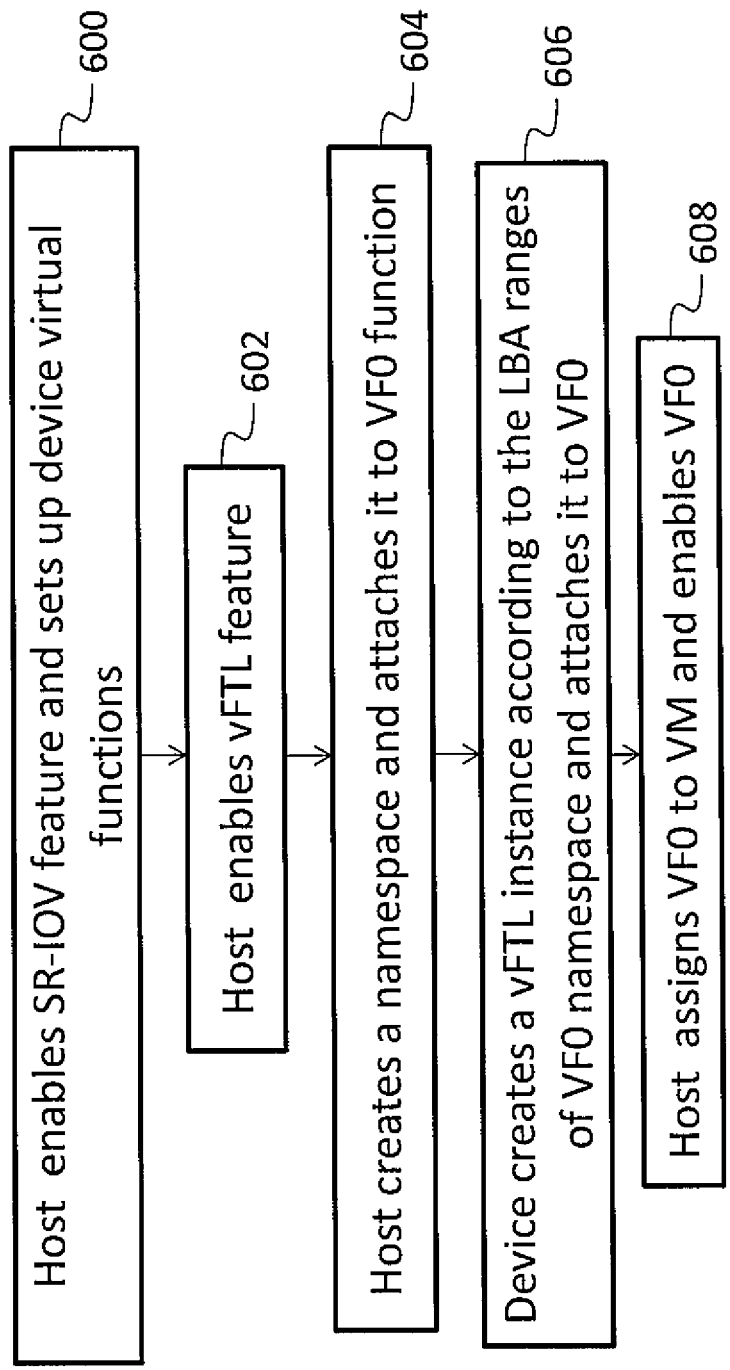
FIG. 6A is a flow chart of device initialization, according to an embodiment of the present invention.

In one embodiment, device initialization proceeds as illustrated in FIG. 6A. In an act 600, the host 102 enables SR-IOV and sets up virtual functions 105, including a first virtual function VF0, for the mass storage device. In an act 602, the host 102 enables the virtual flash translation layer feature. In an act 604, the host 102 creates a namespace and attaches it to a first virtual function VF0. In an act 606, the mass storage device creates a virtual flash translation layer instance according to the logical block address ranges of the namespace of the first virtual function VF0. In an act 608, the host 102 assigns the first virtual function VF0 to a first virtual machine and enables the first virtual function VF0. This process may be repeated for other virtual machines and namespaces.

Figure 6B:
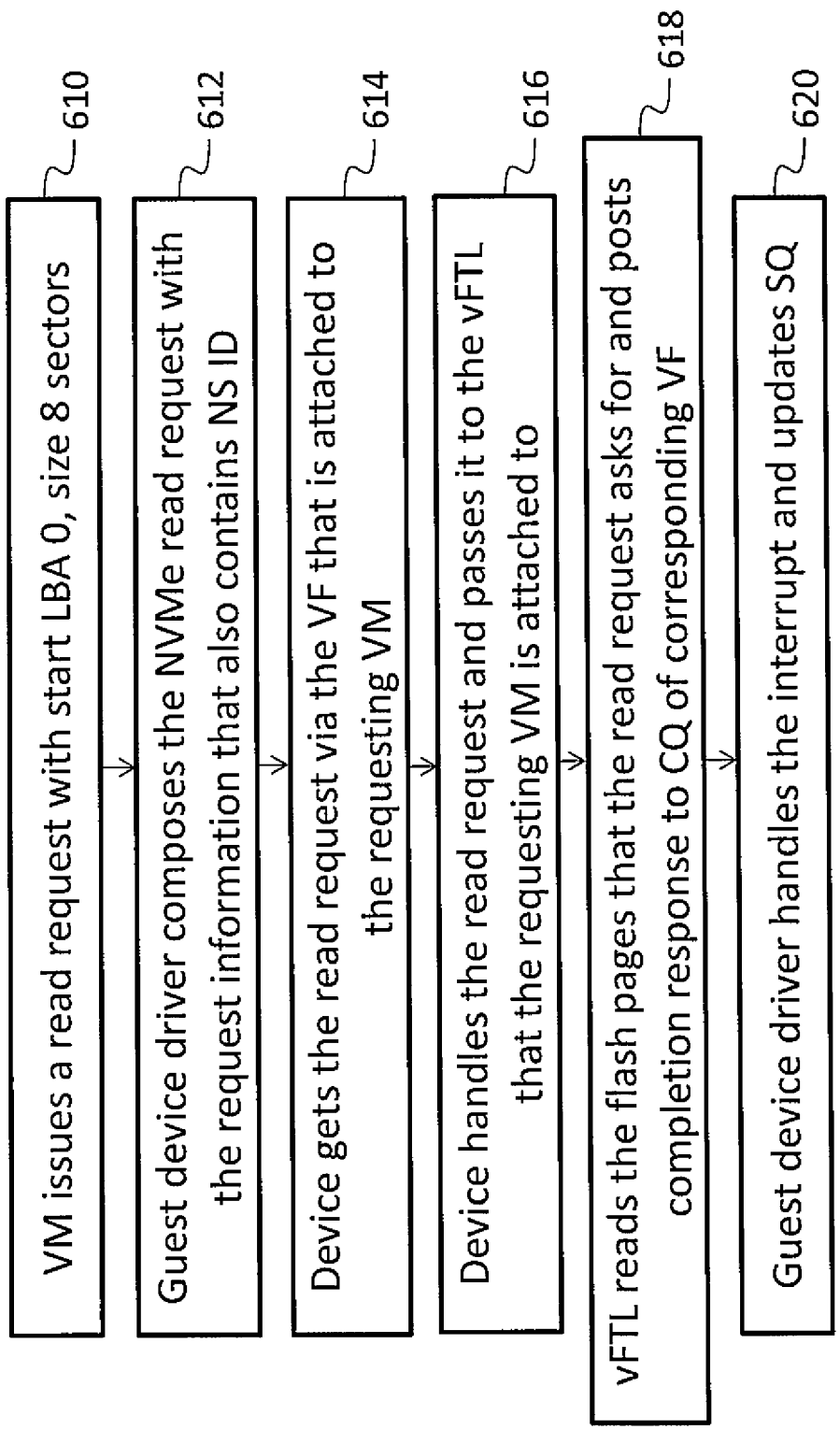
FIG. 6B is a flow chart of processing of a read request, according to an embodiment of the present invention.

In one embodiment, read request handling proceeds as illustrated in FIG. 6B. In an act 610, the virtual machine issues a read with, for example, a start logical block address of 0, and a size of 8 sectors. In an act 612, the guest device driver on the host 102 composes a corresponding Non Volatile Memory Express (NVMe) read request with the request information; the NVMe read request also contains the namespace identifier. In an act 614, the mass storage device receives the read request via the virtual function that is attached to the requesting virtual machine. In an act 616, the mass storage device handles the read request and passes it to the virtual flash translation layer instance that the requesting virtual machine is attached to. In an act 618, the virtual flash translation layer instance reads the flash pages that the read request asks for and posts a completion response to the completion queue (CQ) of the corresponding virtual function; the guest device driver may then inform the submission queue (SQ). In an act 620, the guest device driver handles the interrupt and updates the submission queue. The result of the read operation may be returned to the virtual machine by the virtual function.

Figure 6C:
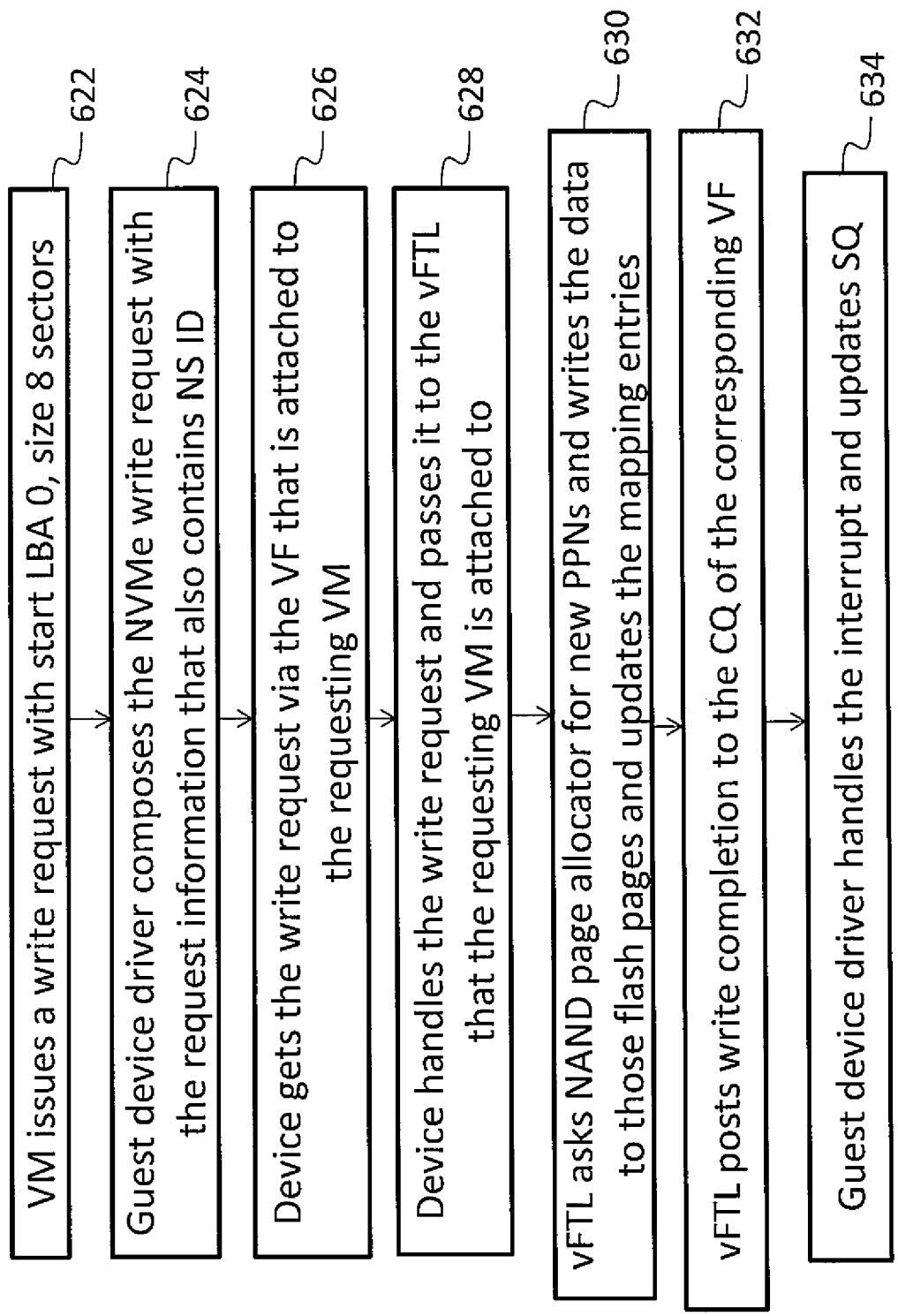
FIG. 6C is a flow chart of processing of a write request, according to an embodiment of the present invention.

In one embodiment, write request handling proceeds as illustrated in FIG. 6C. In an act 622, the virtual machine issues a write request with, for example, a start logical block address of 0, and a size of 8 sectors. In an act 624, the guest device driver on the host 102 composes a corresponding NVMe write request with the request information; the NVMe write request also contains the namespace identifier. In an act 626, the mass storage device receives the write request via the virtual function that is attached to the requesting virtual machine. In an act 628, the mass storage device handles the write request and passes it to the virtual flash translation layer instance to which the requesting VM is attached. In an act 630, the virtual flash translation layer instance asks the NAND page allocator for new physical page numbers (e.g., the virtual flash translation layer instance requests new physical page numbers from the NAND page allocator) and writes the data to those flash pages and updates the mapping entries. In an act 632, the virtual flash translation layer instance posts write completion to the completion queue (CQ) of the corresponding virtual function. In an act 634, the guest device driver on the host 102 handles the interrupt and updates the submission queue (SQ).

As such, some embodiments provide a virtual flash translation layer that is virtual machine aware, resulting in improved system performance.

The term "controller" is used herein to include any combination of hardware, firmware, and software, employed to process data or digital signals. Controller hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a controller, as used herein, each function is performed either by hardware configured, i.e., hard-wired, to perform that function, or by more general purpose hardware, such as a CPU, configured to execute instructions stored in a non-transitory storage medium. A controller may be fabricated on a single printed wiring board (PWB) or distributed over several interconnected PWBs. A controller may contain other controllers; for example a controller may include two controllers, an FPGA and a CPU, interconnected on a PWB.

The mass storage device and/or any other relevant devices or components according to embodiments of the present invention described herein may be implemented utilizing any suitable hardware, firmware (e.g. an application-specific integrated circuit), software, or a combination of software, firmware, and hardware. For example, the various components of the mass storage device may be formed on one integrated circuit (IC) chip or on separate IC chips. Further, the various components of the mass storage device may be implemented on a flexible printed circuit film, a tape carrier package (TCP), a printed circuit board (PCB), or formed on one substrate. Further, various components of the mass storage device may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the example embodiments of the present invention.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element is referred to as being "on", "connected to", or "coupled to" another element, it may be directly on, connected to, or coupled to, the other element, or one or more intervening elements may be present. In contrast, when an element is referred to as being "directly on", "directly connected to", or "directly coupled to", another element, there are no intervening elements present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although example embodiments of a VM-aware FTL design for SR-IOV NVMe SSD have been specifically described and illustrated herein, many modifications and variations will be apparent to those skilled in the art. Accordingly, it is to be understood that a VM-aware FTL design for SR-IOV NVMe SSD constructed according to principles of this invention may be embodied other than as specifically described herein. The invention is also defined in the following claims, and equivalents thereof.

What is claimed is:

1. A mass storage device, comprising:
a flash memory, and
a controller,
the flash memory comprising
a first physical block comprising one or more physical pages, wherein a first set of physical blocks comprises the first physical block and first overprovision blocks reserved for storage of data for garbage collection operations; and
a second physical block comprising one or more physical pages, wherein a second set of physical blocks comprises the second physical block and second overprovision blocks reserved for the storage of data for the garbage collection operations,
the controller being configured to implement:
a first virtual flash translation layer instance having a first weight, and
a second virtual flash translation layer instance having a second weight,
a unit of data being stored, in its entirety, during a first period of time,
in the first physical block, under an exclusive control of the first virtual flash translation layer instance, or
in the second physical block, under the exclusive control of the second virtual flash translation layer instance,
wherein:
the first physical block or the second physical block is a smallest unit of flash memory that is erasable in one operation,
a product of
a ratio of a count of physical blocks in the first overprovision blocks to a count of physical blocks in the first set of physical blocks, and
a ratio of a count of physical blocks in the second set of physical blocks to a count of physical blocks in the second overprovision blocks,
is equal to a ratio of the first weight to the second weight.

2. The mass storage device of claim 1, wherein:
the first set of physical blocks comprising the first physical block is assigned to the first virtual flash translation layer instance; and
the first virtual flash translation layer instance is configured to perform garbage collection on the first set of physical blocks,
the garbage collection comprising:
moving data stored in a third physical block of the first set of physical blocks to other physical blocks, and marking the third physical block for erasure,
the third physical block becoming available for assignment to the second virtual flash translation layer instance based on determining that the third physical block is marked for erasure.

3. The mass storage device of claim 2, wherein:
the second set of physical blocks comprising the second physical block is assigned to the second virtual flash translation layer instance; and
the second virtual flash translation layer instance is configured to perform the garbage collection on the second set of physical blocks.

4. The mass storage device of claim 1, comprising:
the first set of physical blocks comprising the first physical block, the first set of physical blocks comprising pages allocated to the first virtual flash translation layer instance, and
the second set of physical blocks comprising the second physical block, the second set of physical blocks not including the pages allocated to the first virtual flash translation layer instance,
the mass storage device further comprising a page allocator, the page allocator being configured to allocate the pages to the first virtual flash translation layer instance in response to storage access requests, an allocation of pages to the first virtual flash translation layer instance comprising:
allocating a page:
preferentially in a block of the first set of physical blocks, or
in a block of the second set of physical blocks,
based on page availability.

5. A system comprising:
a host, and
the mass storage device according to claim 1,
the host comprising:
a first virtual machine associated with a first namespace; and
a second virtual machine associated with a second namespace,
the first virtual machine being configured to send storage access requests to the first virtual flash translation layer instance instantiated in the mass storage device, and
the second virtual machine being configured to send storage access requests to the second virtual flash translation layer instance instantiated in the mass storage device.

6. The system of claim 5, wherein the host further comprises:
a third virtual machine associated with the second namespace,
the third virtual machine being configured to send the storage access requests to the second virtual flash translation layer instance.

7. The system of claim 5, wherein the host comprises a hypervisor, configured:
to assign to the first virtual machine the first weight, proportional to an anticipated write activity level of the first virtual machine; and
to assign to the second virtual machine the second weight, proportional to an anticipated write activity level of the second virtual machine.

8. The system of claim 5, wherein the host comprises a hypervisor, configured:
to assign to the first virtual machine the first weight, proportional to a persistent storage quality of service of the first virtual machine; and
to assign to the second virtual machine the second weight, proportional to a persistent storage quality of service of the second virtual machine.

9. The system of claim 5, wherein:
the first set of physical blocks comprising the first physical block is assigned to the first virtual flash translation layer instance; and
the first virtual flash translation layer instance is configured to perform garbage collection on the first set of physical blocks,
the garbage collection comprising:
moving data stored in a third physical block of the first set of physical blocks to other physical blocks, and marking the third physical block for erasure,
the third physical block becoming available for assignment to the second virtual flash translation layer instance based on determining that the third physical block is marked for erasure.

10. The system of claim 9, wherein:
the second set of physical blocks comprising the second physical block is assigned to the second virtual flash translation layer instance;
the second virtual flash translation layer instance is configured to perform the garbage collection on the second set of physical blocks.

11. The system of claim 9, comprising:
the first set of physical blocks comprising the first physical block, the first set of physical blocks comprising pages allocated to the first virtual flash translation layer instance, and
the second set of physical blocks comprising the second physical block, the second set of physical blocks not including the pages allocated to the first virtual flash translation layer instance,
the mass storage device further comprising a page allocator, the page allocator being configured to allocate the pages to the first virtual flash translation layer instance in response to the storage access requests, an allocation of pages to the first virtual flash translation layer instance comprising:
allocating a page:
preferentially in a block of the first set of physical blocks, or
in a block of the second set of physical blocks,
based on page availability.

12. A method, comprising:
receiving, by a first virtual flash translation layer instance in a mass storage device comprising one or more physical blocks, a first storage access request directed to a first logical page number;
generating, by the first virtual flash translation layer instance, a storage access request directed to a physical page number within a first subset of the physical blocks;
receiving, by a second virtual flash translation layer instance in the mass storage device, a second storage access request directed to a second logical page number; and
generating, by the second virtual flash translation layer instance, a storage access request directed to a physical page number within a second subset of the physical blocks,
a first unit of data being stored, in its entirety, during a first period of time,
in a first physical block of the first subset of the physical blocks, under an exclusive control of the first virtual flash translation layer instance, or
in a second physical block of the second subset of the physical blocks, under the exclusive control of the second virtual flash translation layer instance,
wherein:
the first physical block or the second physical block is a smallest unit of flash memory that is erasable in one operation,
the first virtual flash translation layer instance has a first weight and the second virtual flash translation layer instance has a second weight;
the first subset comprises a first overprovision blocks reserved for storage of data for garbage collection operations;
the second subset comprises a second overprovision blocks reserved for the storage of data for the garbage collection operations; and a product of
a ratio of a count of physical blocks in the first overprovision blocks to a count of physical blocks in the first subset of the physical blocks, and
a ratio of a count of physical blocks in the second subset of the physical blocks to a count of physical blocks in the second overprovision blocks,
is equal to a ratio of the first weight to the second weight.

13. The method of claim 12, further comprising:
creating, by a host, a first namespace and a second namespace;
attaching, by the host, the first namespace to a first virtual function configured to interact with the first virtual flash translation layer instance; and
attaching, by the host, the second namespace to a second virtual function configured to interact with the second virtual flash translation layer instance.

14. The method of claim 13, further comprising:
creating, by the host, a first virtual machine and a second virtual machine,
assigning, by the host, the first virtual function to the first virtual machine, and
assigning, by the host, the second virtual function to the second virtual machine.

15. The method of claim 14, further comprising,
composing, by a guest device driver on the host, a read request comprising the first namespace;
receiving, by the mass storage device, through the first virtual function, the read request;
processing, by the first virtual flash translation layer instance, the read request; and
returning, through the first virtual function, a result of the read request.

16. The method of claim 14, further comprising,
composing, by a guest device driver on the host, a write request comprising:
data to be written and
an identifier for the first namespace;
receiving, by the mass storage device, through the first virtual function, the write request;
processing, by the first virtual flash translation layer instance, the write request;
requesting, by the first virtual flash translation layer instance, from a page allocator of the mass storage device, one or more physical page numbers corresponding to physical pages available for writing;
receiving the one or more physical page numbers from the page allocator; and
writing the data to one or more physical pages corresponding to the received one or more physical page numbers.

17. The method of claim 12, further comprising performing the garbage collection operations, by the first virtual flash translation layer instance, on the first subset.

18. A mass storage device, comprising:
a flash memory, and
a controller,
the flash memory comprising:
a first physical block comprising:
a first physical page; and
a second physical page, wherein a first set of physical blocks comprises the first physical block and first overprovision blocks reserved for storage of data for garbage collection operations,
the controller being configured to implement:

a first virtual flash translation layer instance having a first weight, and
a second virtual flash translation layer instance having a second weight,
a unit of data being stored, in its entirety, during a first period of time,
in the first physical page, under an exclusive control of the first virtual flash translation layer instance, or
in the second physical page, under the exclusive control of the second virtual flash translation layer instance,
wherein:
the first physical block is a smallest unit of flash memory that is erasable in one operation, and
a product of
a ratio of a count of physical blocks in the first overprovision blocks to a count of physical blocks in the first set of physical blocks, and
a ratio of a count of physical blocks in a second set of physical blocks to a count of physical blocks in second overprovision blocks of a second set of physical blocks,
is equal to a ratio of the first weight to the second weight.

19. The mass storage device of claim 18, wherein:
the flash memory further comprises a second physical block,
the controller is further configured to implement a third virtual flash translation layer instance,
the second physical block is assigned, during a second period of time, entirely to the third virtual flash translation layer instance, and
the second physical block is the smallest unit of flash memory that is erasable in one operation.

20. The method of claim 12, further comprising:
allocating a third physical block, of the one or more physical blocks, to the first virtual flash translation layer instance and making the third physical block a member of the first subset of the physical blocks,
a second unit of data being stored, during a second period of time,
in the first physical block, under the exclusive control of the first virtual flash translation layer instance, or
in the second physical block, under the exclusive control of the second virtual flash translation layer instance, or
in the third physical block, under the exclusive control of the first virtual flash translation layer instance;
the third physical block being the smallest unit of flash memory that is erasable in one operation.

\* \* \* \* \*